(No Model.)
L. F. JORDAN.
PIPE COUPLING.
No. 579,986. Patented Apr. 6, 1897.
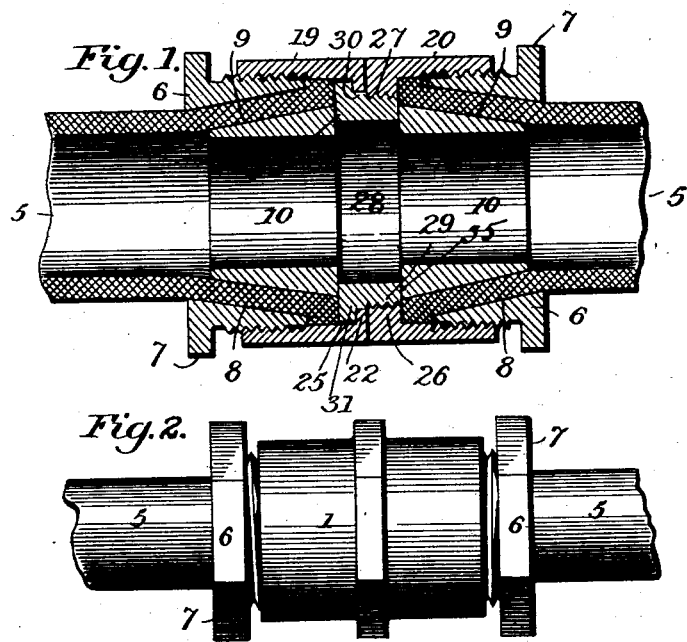
Witnesses
Jno. G. Hinkel
E. Everett Ellis
Inventor
Linwood F. Jordan
by
Foster & Freeman
Attorneys

UNITED STATES PATENT OFFICE.

LINWOOD F. JORDAN, OF PORTLAND, MAINE, ASSIGNOR TO JOSEPH H. CLARKE, TRUSTEE, OF SOMERVILLE, MASSACHUSETTS.

PIPE-COUPLING.

SPECIFICATION forming part of Letters Patent No. 579,986, dated April 6, 1897.

Application filed July 1, 1895. Serial No. 554,636. (No model.)

*To all whom it may concern:*

Be it known that I, LINWOOD F. JORDAN, a citizen of the United States, residing at Portland, in the county of Cumberland and State of Maine, have invented certain new and useful Improvements in Pipe-Couplings, of which the following is a specification.

This invention relates to certain new and useful improvements in pipe-couplings; and it consists, substantially, in such features of construction, arrangement, and combinations of parts as will hereinafter be more particularly described.

The invention has for its object the provision of means for readily and effectively connecting the ends of pipe-sections irrespective of the character of the material of which such sections may be composed.

The invention also has for its objects the provision of perfectly fluid-tight joints between the coupling and the ends of the pipe-sections, and also to dispense with the use of solder and washers and to enable the several parts to be tightened up without special tools. These objects are attained by the means illustrated in the accompanying drawings, in which—

Figure 1 is a sectional view. Fig. 2 is an external view to indicate the appearance of the coupling device and pipe-sections when joined together or united.

While my improved coupling device is capable of several different embodiments, I prefer in the practice of my invention to resort to the construction such as I have herein illustrated, and it will be understood that whether the coupling be employed to connect the ends of flexible pipe-sections or metallic pipe-sections the construction of said coupling is the same in both instances.

I will first describe the construction and arrangement of the several parts comprising one form of coupling and will then explain the manner in which the pipe-sections are united or joined together.

Fig. 1 represents a modification wherein the body portion of my improved coupler comprises a two-part device united by a swivel connection. These parts are indicated at 19 and 20, respectively, and consist of two rings, each of which is screw-threaded interiorly to receive the nipples 6, which are threaded to screw into said rings. The said ring or part 19 is formed or provided at its inner end with an inwardly-projecting annular flange 22, the inner surface of which is perfectly smooth, as is also the inner surface of the ring for a short distance, as indicated at 25. The other ring 20 is formed with a similar inwardly-projecting annular flange 26, the inner surface of which flange, however, is screw-threaded at 27 for a purpose presently explained. These two rings or parts are movably united or joined together by means of a nipple 28, screw-threaded externally at 29 and having a smooth portion 30 and provided with a projecting annular flange 31. The said nipple 28 is slipped into the ring 19 in such manner that the flange 22 of the ring and the flange 31 of the nipple will become engaged, while the screw-threaded portion of the nipple will protrude beyond the inner end of said ring or part 19. As thus arranged the opposite ring or part 20 is screwed up onto the nipple 28 by means of the screw-threaded annular flange of the said ring, and when the said nipple is screwed into the said latter ring as far as it can go the inner edge of the nipple will be flush with the inner edge of the flange 26, and thus will the bearing-surfaces 35 35 be constituted for the end of the pipe-sections. After the ring 20 is screwed up on the nipple a suitable solder is poured in between the flange and nipple, so that the said nipple and ring 20 will become practically integral or permanently united, while the ring 19 will be free to turn upon the swivel in an obvious manner.

To connect the end of pipe-sections, the ends of the sections are inserted or passed through the nipples 6, and the portions of the said sections which protrude beyond the inner ends of the nipples are expanded sufficiently to adapt them to receive the hollow conical plugs 10, which latter are placed within the openings so expanded, after which the nipples are started in the threaded openings of the rings. The function of these plugs is to prevent the material of the pipe-sections from being bent or turned inwardly as the clamping-nipples are screwed up into place, the effect of the nipples being to spread the protruding portions of the sections in such manner as to completely fill the spaces between the inner ends of the nipples and the bearing-surfaces 35 35. By thus forming the coupling in two parts or sections movably joined together it is evident that the attachment or connection of the ends of the pipe-sections can be quickly and effectively made without having to turn the pipe-sections at all, and this is a decidedly valuable characteristic, particularly in instances where the pipe-sections are of considerable length, which obviously would render the operation very difficult, as well as consuming considerable valuable time.

No washers or gaskets are employed to render the joints fluid-tight, and the employment of solder is absolutely dispensed with, which also is a desideratum, since the use of a solder always necessitates the employment of heat as well as soldering-tools, and these are all unnecessary in the use of my invention. I desire to add that the upsetting of the ends of the pipe-sections is very quickly and easily effected by the employment of any simple tool, particularly in the case of lead pipe, while with pipe-sections made of soft steel or iron the upsetting or expanding of the ends of the pipe-sections is quite as readily effected by the use or employment of an ordinary pipe-expander such as is used for expanding boiler-tubes and the like.

It is evident that various immaterial changes could be resorted to in the practice of my invention and still be within the scope thereof, and therefore, without limiting myself to the precise details of construction and arrangement of parts shown,

I claim—

1. In a pipe-coupling, the combination of a coupling-section comprising two independently-movable rings, provided at their adjacent ends with annular flanges and each screw-threaded internally, a threaded nipple uniting said rings and constituting opposite internal bearing-surfaces, the threaded clamping-nipples screwing into said rings and having flaring openings, the pipe-sections with their ends protruding beyond said nipples and upset or expanded, and the hollow conical plugs within the ends of the pipes, substantially as described.

2. A pipe-coupling comprising two independently-movable ring-sections screw-threaded internally for a suitable distance, and having abutting annular flanges at their adjacent ends, of which one is screw-threaded and the other smooth as is also a part of its ring, a threaded nipple screwing into the screw-threaded flange and being smooth for a part of its length and having a smooth annular flange engaging the smooth flange of the ring-section, the threaded clamping-nipples having flared openings, the pipe-sections flared and protruding beyond said nipples, and the hollow conical plugs, substantially as described.

In testimony whereof I have signed my name to this specification in the presence of two subscribing witnesses.

LINWOOD F. JORDAN.

Witnesses:
E. EVERETT ELLIS,
JOHN G. HINKEL.